3,272,693
Patented Sept. 13, 1966

3,272,693
METHODS OF CONTROLLING FUNGI WITH ALPHA,ALPHA-DIALKYL AND ALKYLENE ALIPHATIC ACIDS AND SALTS THEREOF
Jean Bradley Harrison, Niagara Falls, N.Y., assignor to E. I. du Pont de Nemours and Company, Wilmington, Del., a corporation of Delaware
No Drawing. Filed July 20, 1964, Ser. No. 383,922
6 Claims. (Cl. 167—22)

This application is a continuation-in-part application of my copending application Serial No. 252,572, filed January 21, 1963 (now abandoned), which in turn is a continuation-in-part application of my copending application Serial No. 172,082, filed February 9, 1962 (now abandoned).

This invention relates to fungicidal methods and compositions.

More particularly, this invention concerns the use of $\alpha,\alpha$-dialkyl and alkylene aliphatic acids, acid chlorides, salts and compositions containing them in controlling a broad group of fungi causing damage to seeds, plants and manufactured goods.

The general formula of these fungicidal compounds is:

(1)

wherein

Q is $OR_4$ and Cl;

$R_1$, $R_2$ and $R_3$ are alkyl groups each containing 1 through 10 carbon atoms or alkenyl groups each containing 2 through 10 carbon atoms, with the limitation that $R_1$, $R_2$ and $R_3$ added together will contain at least 6 carbon atoms and not more than 12 carbon atoms; and $R_4$ is hydrogen, calcium, magnesium, zinc, manganese, copper, iron, nickel, cadmium, sodium, potassium basic salts of zinc, manganese, cadmium, copper, iron and nickel, ammonium, mono-, di- or tri-(alkyl)ammonium where each alkyl group has 1 through 4 carbon atoms, mono-, di- or tri-(alkoxyalkyl)ammonium where the alkoxy and alkyl group each has 1 through 4 carbon atoms, mono-, di- or tri-(hydroxyalkyl)ammonium where the alkyl group has 1 through 4 carbon atoms.

Preferred because of their outstanding fungicidal activity, ease of manufacture and low cost are those compounds of Formula 1 wherein:

Q is $OR_4$ and
$R_1$, $R_2$ and $R_3$ contain at least 8 carbon atoms and not more than 12 carbon atoms.

Particularly preferred because of the most outstanding fungicidal activity are those compounds of Formula 1 wherein:

$R_2$ and $R_3$ are each methyl and
$R_1$ is an alkyl of 6, 7, 8 or 9 carbon atoms.

It is understood that mixtures of the above compounds provide the most acceptable fungicides.

Compounds used in this invention have been applied to selected mature plants, e.g., when 40% of the cotton bolls have opened, to defoliate them, see Bartlett, U.S. Patent 2,988,440, issued June 13, 1961. Now it is discovered that these same compounds, quite surprisingly, can be applied to the soil, ornamental plants, trees and other young plants whose foliage and sex organs have not fully formed, to seeds, and to manufactured goods as paints, garments, draperies, rugs and the like, to control fungi that cause millions of dollars in damage each year to the agricultural and manufacturing industries of the world.

Illustrative of the compounds useful in this invention are the following:

(1) 2,2,4,4-tetramethylvaleric acid
(2) 2,3-dimethyl-2-(n-propyl)caproic acid
(3) 2-methyl-2-(n-propyl)heptanoic acid
(4) 2,2,3,3,4-pentamethylvaleric acid
(5) 2-methyl-2-ethylcaproic acid
(6) 2,2-dimethylheptanoic acid
(7) 2,3-dimethyl-2-ethylvaleric acid
(8) 2,2,3,4,4-pentamethylcaproic acid
(9) 2,3-dimethyl-2-allyl-5-hexenoic acid
(10) 2,3,5-trimethyl-2-(isobutyl)-caproic acid
(11) 2,4,4-trimethyl-2-(n-propyl)-caproic acid
(12) 2,2,4,4,6,6-hexamethylheptanoic acid
(13) 2,3,4-trimethyl-2,3-diethylcaproic acid
(14) 2,2-dimethylundecanoic acid
(15) 2,2,3,3,4,4,5-heptamethylcaproic acid
(16) 2,3,4,4-tetramethyl-2-(tert-butyl)-valeric acid
(17) 2,4,4-trimethyl-2-(vinyl)-5-hexenoic acid
(18) 2,2,3,3,4,4,5-heptamethylcaproic acid
(19) 2,2,3,3,4,4,5-heptamethylcaproic acid, ammonium salt
(20) 2,2,3,4,4-pentamethylcaproic acid, methylamine salt
(21) 2,3,4-trimethyl-2,3-diethylcaproic acid, butylamine salt
(22) 2,3,5-trimethyl-2-(isobutyl)-caproic acid, tris(butoxyethyl)amine salt
(23) 2,2-dimethylundecanoic acid, triethanolamine salt
(24) 2,4,4-trimethyl-2-(n-propyl)-caproic acid, ethanolamine salt
(25) 2,4,4-trimethyl-2-(vinyl)-5-hexenoic acid, diethanolamine salt
(26) 2,2,4,4,6,6-hexamethylheptanoic acid, sodium salt
(27) 2,2,3,3,4,4,5-heptamethylcaproic acid, potassium salt
(28) 2,2-dimethylheptanoic acid, calcium salt
(29) 2-methyl-2-ethylcaproic acid, magnesium salt
(30) 2,2,3,3,4-pentamethylvaleric acid, manganese salt
(31) 2,2,3,4,4-pentamethylcaproic acid, cadmium salt
(32) 2,3,5-trimethyl-2-(isobutyl)-caproic acid, copper salt
(33) 2,2,3,3,4,4,5-heptamethylcaproic acid, nickel salt
(34) 2,2,4,4-tetramethylvaleric acid, basic copper salt
(35) 2,2,3,3,4,4,5-heptamethylcaproic acid, basic iron II salt
(36) 2,2,4,4-tetramethylvaleric acid chloride
(37) 2,2,3,3,7-pentamethylnonanoic acid
(38) 2,2,4,4-tetramethylvaleric acid, dimethylamine salt
(39) 2,2,3,3-tetramethylbutyric acid
(40) 2,2,3,3,4,4,5-heptamethylcaproic acid, trimethylamine salt
(41) 2,2,3,3,4,4,5-heptamethylcaproic acid, ethoxyethylamine salt
(42) 2,2,3,3,4,-pentamethylvaleric acid, ethanolamine salt
(43) 2,2,4,4,6,6-hexamethylheptanoic acid, zinc salt
(44) 2,2,3,4,4-pentamethylcaproic acid, basic nickel salt
(45) 2,2,4,4-tetramethylvaleric acid, tri(hydroxyethyl) ammonium salt

USE

The compounds used in this invention possess outstanding broad spectrum fungicidal activity and show no apparent phytotoxicity when applied to plants at fungicidal concentrations. Hard-to-kill fungi which are particularly well controlled by the compounds of this invention are *Rhizoctonia solani*, *Pythium* spp., and *Fusarium* spp. The $\alpha,\alpha$-dialkyl aliphatic acids can also be used to control such turf diseases as dollar spot caused by *Sclerotinia*

*homocarpa,* brown patch caused by *Pellicularia filamentosa,* snow mold caused by *Fusarium nivali,* copper spot caused by *Gleocercospora sorghi* and blight caused by *Helminthosporium* spp.

Besides being effective as plant protectant fungicides, compounds of this invention protect seeds and manufactured goods especially fibers such as cotton and wool from attack by fungi.

COMPOSITIONS

Fungicidal compositions of this invention can contain one or more surface-active agents. The surfactant or "surface-active agent" can include any of the anionic, cationic and non-ionic surface-active agents. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers Annual" (1963) by John W. McCutcheon, Inc., and Bulletin E–607 of the Bureau of Entomology and Plant Quarantine of the U.S. Department of Agriculture.

Among the more preferred surfactants are those anionic and non-ionic agents recognized in the art as wetting agents, detergents or emulsifiers. Among the anionic surfactants, preferred ones are alkali metal or amine salts of alkyl benzene sulfonic acids such as dodecylbenzene sulfonic acid, sodium lauryl sulfate, alkyl naphthalene sulfonates, sodium-N-methyl-N-oleoyltaurate, oleic acid ester of sodium isethionate, diacetyl sodium sulfosuccinate, sodium dodecyldiphenyl oxide disulfonate. Among the non-ionic compounds, the preferred members are alkyl phenoxy poly(ethyleneoxy)ethanols such as nonyl phenol adducts with ethylene oxide; trimethyl nonyl polyethylene glycol esters, polyethylene oxide adducts of fatty and rosin acids, long chain alkyl or mercaptan adducts with ethylene oxide.

Surfactants can be present in compositions of this invention in the range of 0.02 to 20% by weight. However, ratios of surfactant to active as high as 0.2 to 10% by weight are preferred.

Low strength compositions containing 1–5% by weight of an acid or acid chloride of this invention can contain with or without surfactant present, common liquid solvents such as alcohols, ketones, chlorinated hydrocarbons, Cellosolves, aliphatic and aromatic hydrocarbons and N,N-dialkyl amides. Preferred liquid solvents include xylene, alkylated naphthalene, cyclohexane, cyclohexanone, chloroethanes and dimethyl formamide. These low strength compositions containing one or more of the above-mentioned solvents can be used for direct application to the soil.

Additionally, acids within the scope of this invention can be formulated into emulsifiable solutions containing 5 to 95% of active by weight plus solvent and emulsifiers to make up 100%. The solvents can be water insoluble. Typical of the solvents used are higher ketones, higher aliphatic and aromatic hydrocarbons, chlorinated hydrocarbons and the like. Preferably, alkylated naphthalene, xylene, isophorone, decane or cyclohexanone alone or in combination is used.

The sodium, potassium, ammonium and amine salts can be typically applied directly in water where the active compound ordinarily is present in the range of 5 to 95% by weight.

Additional compositions can be formulated by adding a free-flowing inert powder to the active agent.

Free-flowing inert powders can be any of the extenders commonly employed in the fungicide art. They can include natural clay such as attapulgite, diatomaceous earth, talc, synthetic mineral fillers derived from silica and silicates such as synthetic fine silica and synthetic calcium or manganese silicate, wood flour and walnut shell flour.

Particle size of the extender can vary considerably but will ordinarily be somewhat under 50 microns in the finished formulation.

In powdered compositions the active compound can be combined with the powder to form pellets or granules. In these compositions the active compound ordinarily will be present at the rate of 2 to 25% by weight.

In other compositions containing the active ingredient, one or more surfactants and a free-flowing dust made up of small particles of the above-described powders, the active compound ordinarily will be present in a concentrate at the rate of 2 to 50% by weight.

All the active compounds used in this invention can be formulated in a wettable powder mixture containing surfactant, powder and 25 to 80% active ingredient by weight.

Compositions of this invention can additionally contain other fungicides in order to control a broader spectrum of fungi. Illustrative of some of these fungicides are:

p-dimethylaminobenzenediazosodium sulfonate;
quinone oxyaminobenzooxohydrazone;
tetraalkylthiuram sulfides such as tetramethylthiuram monosulfide or disulfide and tetraethylthiuram monosulfide or disulfide;
metal salts of ethylenebisdithiocarbamic acid, e.g., manganese, zinc, iron and sodium salts;
pentachloronitrobenzene;
dodecylguanidine acetate;
N-trichloromethylthio tetrahydrophthalimide (Captan);
phenylmercury acetate;
2,4-dichloro-6-(o-chloroanilino)-s-triazine;
N-methylmercury p-toluenesulfonanilide;
chlorophenyl mercuri hydroxide;
nitrophenol mercuri hydroxides;
ethyl mercury acetate;
ethyl mercury 2,3-dihydroxypropyl mercaptide;
methyl mercury acetate;
methyl mercury 2,3-dihydroxypropyl mercaptide;
3,3'-ethylenebis(tetrahydro-4,6-dimethyl-2H-1,3,5-thiadiazine-2-thione);
methyl mercury dicyandiamide;
N-ethyl mercury-p-toluenesulfonanilide metal (e.g., iron, sodium and zinc), ammonium and amine salts of dialkyldithiocarbamic acids;
tetrachloronitroanisole;
hexachlorobenzene;
methyl mercury nitrile;
tetrachloroquinone; and
N-trichloromethylthiophthalimide.

The above fungicides are added to compositions containing a dialkyl aliphatic acid or its derivatives at the rate of 1 to 400 pounds to each 20 pounds of a compound within the scope of this invention. Illustrative of fungicides used at low rates with the dialkyl aliphatic acids are the above-described organo mercurials. Illustrative of fungicides used at high rates with the dialkyl aliphatic acids are thiuram sulfides and captan. Of course, more or less of the above-listed fungicides can be added to an $\alpha,\alpha$-dialkyl aliphatic acid composition depending on the fungi present in the area to be protected.

Compositions of this inventions can additionally contain soil insecticides such as chlordane, DDT, dieldrin and methoxychlor.

APPLICATION

Compounds used in this invention can be sprayed directly or in formulations on a locus of present or potential fungus growth; namely ornamental plants, trees, seeds, seedlings or other plants and manufactured goods.

When applied to the soil compounds of this invention are generally applied before emergence of plants at a broadcast dosage of 20 to 200 pounds of active ingredient per acre to give satisfactory control of fungi. Admixed with other fungicides it is possible to use as little as 5 pounds per acre of dialkyl aliphatic acid to give satisfactory control of fungi. A preferred broadcast dosage because of excellent control of fungi at low cost is 50 to 100 pounds of active ingredient per acre. Best results are obtained by spraying directly on a band approximately 4 inches wide over open furrows containing seeds. Spray is directed in such a way as to strike the sides of the furrows as well as the bottom of the furrows. The furrow then can be closed and the seeds are fully protected from fungus attack. In-the-row, one-half to 10 pounds of active ingredient per 12,000 feet of row gives satisfactory control of fungi. A preferred dosage in-the-row because of exceptionally good control of fungi at low cost is 1 to 4 pounds of active ingredient per 12,000 feet of row.

In-the-row treatment is extremely useful in the protection of newly-germinated seedlings of truck crops, i.e. sweet corn, watermelon, squash, carrots, lettuce, cantaloupe, peppers, cucumbers, beans and the like from such soil-borne fungi as Rhizoctonia and Pythium. Soil drench treatment protects tobacco seedlings from the ravages of damping-off organisms by application of the compounds used in this invention as a soil drench to the seed bed at rates of about 30 to 100 pounds of active ingredient per acre and preferably at the rate of 40 to 60 pounds of acitve ingredient per acre. In addition, in-the-row treatment will also protect tomato seedlings from the tomato wilt caused by *Fusarium oxysporum* f. *lycopersiei*.

The compounds used in this invention are also useful when applied as a broadcast treatment at 30 to 100 pounds of active ingredient per acre and preferably at the rate of 40 to 60 pounds of active ingredient per acre in protecting tobacco plants from tobacco black shank caused by *Phytophthora parasitica* var. *nicotianae*.

Compounds used in this invention can also be mixed with cotton seeds by suitable application prior to planting at rates of 1 to 16 ounces per cwt. to give control of fungi. It is preferred, because of excellent control of fungi and a low use-cost ratio to use 2 to 8 ounces of active ingredient per cwt. When cotton seeds are treated with compounds within the scope of this invention in the above-described manner, effective protection of the young germinated cotton seedlings is obtained against Rhizoctonia and Pythium spp. and a good stand of healthy cotton plants is obtained.

Compounds of this invention can be applied to fabrics, i.e., cotton, rayon, wool, silk and the like to protect them from attack by fungi. It is convenient to dip the fabric in solutions containing 0.01 to 5.0% by weight of active ingredient and then to allow the excess solvent to evaporate from the treated fabric. The treated fabrics retain their tensile strength and are not discolored by fungi attack under conditions where untreated fabrics are severely damaged. The addition of the compounds used in this invention to cutting oil emulsions protects the oils against fungal attack and extends the lifetime of the oil. The amount of compound added is 0.01 to 10% by weight of the oil phase of the emulsion. The oil retains its usefulness for longer periods of time as a machine tool cutting oil. Additionally, compounds used in this invention can be added to paint at the rate of 0.01 to 5.0% of active ingredient based on the weight of the paint and this application protects the paint against fungi. The film formed from treated paint resists attack by fungi and other micro-organisms which cause stain under humid exposure conditions. The addition of the compounds used in this invention to oils, greases, waxes, gasoline, diesel oil, fuel oil, coating materials, pre-polymerization mixes, polymers, elastomers, plasticizers, tire cord, rope, twine, string, paper products, wood, textile finishing solutions, adhesives, leather and the like at rates of 0.1 to 10% by weight of active ingredient based on the total weight of the manufactured article protects these materials against attack by fungi.

Compounds used in this invention are old and known to the art.

In order that the invention may be better understood, reference should be had to the following illustrative examples. It should be understood that all percentages given are by weight unless otherwise specified.

*Example 1*

| | Percent |
|---|---|
| 2,2,4,4,6,6-hexamethylheptanoic acid | 25 |
| Trichloroethylene | 75 |

The above solution concentrate is intended for direct application in solvent. It is normally diluted to approximately 5% active with the same or a different solvent before use. Suitable diluent solvents include alcohols such as methanol or ethanol, volatile ketones such as acetone, methyl ethyl ketone, methyl isoamyl ketone, or even ketones of lower volatility such as isophorone, other chlorinated hydrocarbons such as ethylene dichloride, methylene chloride, or chlorobenzene, aliphatic or aromatic hydrocarbons such as diesel fuel oils or alkylated naphthalenes, substituted glycols such as Cellosolves or Carbitols, N,N-dialkyl amides such as dimethylformamide, and aliphatic ethers such as tetrahydrofuran.

Alternatively, of course, the solvent diluents can be interchanged with the trichloroethylene to give other concentrates where solvent power permits.

*Example 2*

One hundred parts by weight of the formulation of Example 1, 2,2,4,4,6,6-hexamethylheptanoic acid, 25%, trichloroethylene, 75%, is diluted with 600 parts by weight of trichloroethylene. This diluted solution is used to treat fabric used for tarpaulins. The cloth is dipped in the antifungal solution until it is thoroughly wetted. The fabric is then removed from the solution. Excess solvent is removed by passing the fabric through rollers. The cloth is then dried by passing it through a chamber of warm circulating air. The treated cloth is thus effectively protected against attack by fungi such as mildew and rot causing organisms which reduced the tensile strength of the fabric and may cause discoloration or strains. To illustrate the effectiveness of the treatment the fabric is buried for 14 days in soil infested with rot-causing organisms. At the end of the exposure period, the tensile strength of the fabric is essentially unchanged and the fabric is not discolored or stained. Untreated fabric similarly stored in infested soil has lost most of its tensile strength and is badly discolored.

*Example 3*

Rayon cord is passed through a 4% solution of 2,2,4,4-tetramethylvaleric acid sodium salt in water and then dried. The cord is then passed through a 5% solution of manganous chloride in water. The manganous salt of α,α-dimethylhendecanoic acid precipitates in the fibers and renders the cord resistant to fungal attack.

*Example 4*

Manila hemp rope is passed through a 5% solution of 2,2,3,3,4-pentamethylvaleric acid in trichloroethylene. The excess solvent is dried off and the rope is thus impregnated with the compound which protects it against attack by fungi. The rope thus retains its tensile strength for a period of time.

*Example 5*

| | Percent |
|---|---|
| 2,2,3,3,4-pentamethylvaleric acid | 35 |
| Alkylated naphthalenes (principally α-methylnaphthalenes) | 60 |
| Polyoxyethylene adduct of tall oil acids | 5 |

The above emulsifiable oil is prepared by mixing the mutually soluble components. It may be diluted with water to produce emulsions suitable for application.

*Example 6*

The formulation of Example 5 is diluted with water to prepare a spray containing 500 p.p.m. of the active component. This formulation is sprayed to run off on apple trees at weekly intervals during the growing season. The foliage and fruit of the treated trees are protected against attack by *Venturia inequalis*.

Example 7

2,2,3,3,4-pentamethylvaleric acid is mixed with the hydrocarbon phase of a machine tool cutting oil emulsion until the spiked hydrocarbon phase contains 3% by weight of the anti-fungal compound. The cutting oil is protected against attack by fungi and it retains its usefulness for a longer period of time.

Example 8

The addition of 1% by weight of 2,2,3,3,4,4,5-heptamethylcaproic acid to paints protects the paints against fungal attack during storage. When the paint is spread onto a surface and dries to a film, the film is resistant to attack by fungi and other micro-organisms which cause stain under humid exposure conditions.

Example 9

The formulation of Example 5 is mixed with water to give an emulsion which is sprayed into an open furrow prior to planting cotton seed and closing the furrow. The application rate is 4 pounds per acre (12,000 feet of row) by this in-the-row treatment (which is equivalent to approximately 80 pounds per acre in the treated strip itself). The cotton seedlings after germination are protected against *Rhizoctonia solani* and Pythium spp. and healthy stands of young cotton plants are obtained.

Example 10

| | Percent |
|---|---|
| 2,2,4,4-tetramethylvaleric acid | 25 |
| Isophorone | 20 |
| Mixed oil soluble petroleum sulfonates and polyoxyethylene ethers | 5 |
| Trimethylnonyl alcohol, ether with polyethylene oxide | 50 |

The above emulsifiable composition is prepared by mixing the mutually soluble components. The active ingredient shows enhanced fungicidal activity when applied in the presence of the high level of surfactant.

Example 11

The formulation of Example 10 is mixed with water to provide an emulsion containing 2000 p.p.m. of the active ingredient. This preparation is sprayed to run off on dormant peach, apricot, almond or nectarine trees. The trees thus treated are protected against attack by *Coryneum beijerinckii* during the following growing season.

Example 12

The formulation of Example 10 is mixed with water and applied to cotton seed in a slurry treater at a rate of 4 ounces of active ingredient per cwt. of seed. The seed is planted in soil and after germination the seedlings are protected against Rhizoctonia and Pythium spp. A healthy stand of cotton plants is obtained.

Example 13

| | Percent |
|---|---|
| 2,2,3,3,4,4,5-heptamethylcaproic acid, sodium salt | 10 |
| Water | 90 |

The above solution prepared by mixing and agitating is a slightly viscous solution which will dilute readily with soft water to yield clear solutions. In hard water areas, there is a conversion to Ca and Mg salts upon dilution but fungicidal activity is retained.

Example 14

The formulation of Example 13 is diluted with water and rotovated into the soil prior to planting bean seeds. The treated area of soil contains approximately 40 pounds active ingredient per acre which is equivalent to 2 pounds active per acre (12,000 feet of row) since an in-the-row application is made. The bean seed planted in the treated bands is protected in germination against the ravages of soil-borne fungi such as Rhizoctonia and Pythium spp. Healthy stands of bean plants are obtained.

Example 15

| | Percent |
|---|---|
| 2,2,3,3,4-pentamethylvaleric acid, manganese salt | 50.0 |
| Alkylnaphthalene sulfonic acid, Na salt | 1.5 |
| Sodium lignin sulfonate | 2.0 |
| Attapulgite clay | 46.5 |

The above wettable powder is prepared by blending the components and micropulverizing until the active is substantially all below 50 microns.

Example 16

The formulation of Example 15 is mixed with water and applied as a broadcast treatment by rotovating it into the soil prior to transplanting tobacco plants from seedling beds into the treated soil. The application rate is 60 pounds per acre. The growing tobacco plants are protected against tobacco black shank caused by *Phytophthora parasitica* var. *nicotianae*.

Example 17

| | Percent |
|---|---|
| 2,2,3,4,4-pentamethylcaproic acid | 25 |
| 15–30 mesh attapulgite granules | 75 |

The above granule concentrate is prepared by spraying the liquid acid at somewhat elevated temperature upon the attapulgite granules while tumbling. The product may be extended with additional untreated granules when treatment at low rates of active per acre is desired.

Example 18

The dry granular formulation of Example 17 is rotovated into soil as an in-the-row application prior to planting squash seeds in the row. The application rate is 2 pounds per acre active ingredient which is equivalent to approximately 40 pounds per acre (12,000 feet of row) in the treated band. The squash seedlings are protected against "damping off" organisms and a healthy stand of young squash plants is obtained.

Example 19

| | Percent |
|---|---|
| 2,2,3,3,4,4,5-heptamethylcaproic acid, zinc salt | 30 |
| Sodium lignin sulfonate | 15 |
| Hydrated attapulgite | 1 |
| Water | 54 |

The above composition is mixed and wet milled in a pebble or sand mill until the particle size is below 10 microns.

Example 20

The formulation of Example 19 is rotovated into soil as a broadcast treatment at a rate of 80 pounds per acre. Tobacco plants in the treated soil are protected against black shank.

Example 21

| | Percent |
|---|---|
| 2,2,3,3,4,4,5-heptamethylcaproic acid | 35 |
| Alkylated naphthalenes (principally α-methylnaphthalenes) | 60 |
| Polyoxyethylene adduct of tall oil acids | 5 |

The active emulsifiable oil is prepared by mixing the mutually soluble components. It may be diluted with water to produce emulsions suitable for application.

Example 22

The formulation of Example 21 is mixed with water and applied as an in-the-row treatment to soil by rotovating it in prior to planting tomato seedlings in the treated bands. The application rate is 4 pounds per acre active ingredient which is approximately equivalent to 80 pounds per acre in the treated band. Young tomato seedlings planted in the treated soil are protected against the tomato wilt caused by *Fusarium oxysporum* f. *lycopersiei*.

Example 23

The formulation of Example 21 is mixed with water and applied at a rate of 60 pounds per acre active ingredient as a soil drench to tobacco seed beds. On germination the young tobacco seedlings are protected against soil-borne "damping off" organisms.

Example 24

| | Percent |
|---|---|
| Mixture of active compound [1] | 3.7 |
| Tetramethylthiuram disulfide | 10.5 |
| Synthetic fine silica | 5.0 |
| Montmorillonoid clay | 80.8 |

[1] This mixture consists of over 70% of a sterically hindered carboxylic acid derived from petroleum, neo-tridecanoic acid, characterized by two methyl groups on the alpha carbon atoms. Thus:

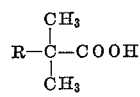

where R represents various branched-chain isomeric nonyl groups. There are at least two or three additional methyl branches somewhat removed from the alpha carbon atom. This mixture is a colorless, odorless liquid with the following properties:

| | |
|---|---|
| Acid No., mg. KOH/g. | 255.3 |
| Theoretical acid No. | 262 |
| Saponification No., mg. KOH/g. | 260.1 |
| Color, Gardner | 1 |
| Refractive index, N38/D | 1.4463 |
| Viscosity at 100° F., Saybolt sec. | 259.8 |
| Appearance | Colorless liquid |
| Density | 0.9032 |
| Distillation *, ° C.: | |
| I.B.P., mm. | 151/10 |
| 5%, mm. | 155 |
| 50%, mm. | 158 |
| 95%, mm. | 163 |
| Dry point, mm. | 167 |

* In apparatus similar to ASTM D1160–57T.

The mixture is known as "Enjay" MD–239 and can be obtained from the Enjay Company, Inc., in Elizabeth, New Jersey.

This composition is prepared by blending all of the ingredients and micropulverizing until the particle size of the formulation is substantially below 50 microns.

The above formulation is added to acid delinted cotton seed in a hopper box at a concentration of 10 pounds per 100 pounds of seed. The seed is planted from the hopper box drawn behind a tractor. This treatment protects both the seed and the seedling from attack by soil fungi such as *Rhizoctonia solani* and *Pythium* spp. resulting in a healthy stand of cotton.

Example 25

| | Percent |
|---|---|
| Mixture of active compounds [2] | 4.2 |
| N-trichloromethylthio tetrahydrophthalimide | 10.0 |
| Synthetic fine silica | 10.0 |
| Montmorillonoid clay | 75.8 |

[2] This mixture consists of neo-decanoic acid, a branched chain, aliphatic monobasic acid derived from petroleum. The most important feature of its structure is the presence of two methyl groups on the carbon atom adjacent to the carboxyl group, resulting in steric hindrance of the functional group. The mixture has no odor. It can be represented by the formula:

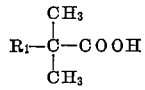

where $R_1$ is various branched chain groups of six carbon atoms. The mixture has the following properties:

| | |
|---|---|
| Acid, No., mg. KOH/g. | 311.5 |
| Theoretical acid No. | 326 |
| Saponification No., mg. KOH/g. | 335.9 |
| Color, Gardner | 1 |
| Refractive index, N38/D | 1.4388 |
| Viscosity at 100° F., Saybolt sec. | 84.8 |
| Appearance | Colorless liquid |
| Density 20/4 | 0.9110 |
| Distillation *, ° C.: | |
| I.B.P., mm. | 79/10 |
| 5%, mm. | 112 |
| 50%, mm. | 130 |
| 95%, mm. | 138 |
| Dry point, mm. | 145 |

* In apparatus similar to ASTM D1160–57T.

This mixture is known as "Enjay" MD–238 and can be obtained from the Enjay Company, Inc., in Elizabeth, New Jersey.

The ingredients of this formulation are blended together and the mix micropulverized until the particle size is substantially less than 50 microns.

The above formulation is applied in the manner of the formulation of Example 24 in like amount by weight. Like results are obtained.

Example 26

| | Percent |
|---|---|
| Mixture of active compounds [2] | 4.00 |
| N-methylmercuri p-toluenesulfonanilide | .96 |
| Attapulgite clay | 20.00 |
| Talc | 75.04 |

[2] See Example 25, supra, for a description of the mixture of active compounds.

This composition is prepared by blending the ingredients thoroughly and micropulverizing until the particle size is substantially less than 50 microns.

The above formulation is applied in the manner of the formulation of Example 24 in like amount by weight. Like results are obtained.

Example 27

| | Percent |
|---|---|
| Mixture of active compounds [3] | 25 |
| Dodecyl guanidine acetate | 25 |
| Dioctyl ester of sodium sulfosuccinic acid | 1 |
| Sodium lignin sulfonate | 1 |
| Kaolin clay | 48 |

[3] This mixture consists of highly branched, predominately tertiary carboxylic acids containing 9 through 11 carbon atoms. These acids are colorless, of low odor and viscosity. They are more particularly described as follows:

| | | |
|---|---|---|
| Acid Value, mg. KOH/g. | ASTM D1467059T | 295–315. |
| Unsaponifiable matter, percent (neutral oil content). | ASTM D1467059T | 5–10. |
| Saponification Value, mg. KOH/g. | ASTM D1467059T | 295–315. |
| Moisture Content, percent. | ASTM D890/51T | 0.1 max. |
| Specific gravity, d. 20/4 | | 0.92. |
| Viscosity at 20° C. | ASTM D445/53T | 42.5 CS. |
| Viscosity at 60° C. | ASTM D445/53T | 7 CS. |
| Vapor Pressure at 20° C. | | 0.015 mm. Hg. |
| Flash point ° C. | Cleveland Open Cup. | 120. |
| Solubility at 20° C. (g./100g. solution): | | |
| Acid in water | | 0.03. |
| Water in acid | | 0.4. |
| Color Hazen (Pt/Co) | ASTM D1209 | 50–100. |
| Color Gardner | ASTM D1467–59T | 1 max. |

This composition is prepared by blending together all of the ingredients and micropulverizing until the particle size of the formulation is substantially less than 50 microns.

The formulation is mixed with water and applied as a broadcast treatment by rotovating it into the soil prior to transplanting tobacco plants from seedling beds into the treated soil. The application rate is 100 pounds per acre total active ingredients. The growing tobacco plants are protected against tobacco black shank caused by *Phytophthora parasitica* var. *nicotianae*.

This mixture is known as "Versatic"® 911 Acid and can be obtained from the Shell Chemical Company of New York, New York.

Example 28

| | Percent |
|---|---|
| Mixture of active compounds [1] | 15 |
| Tetramethylthiuram disulfide | 30 |
| Sodium lignin sulfonate | 2 |
| Alkylnaphthalene sulfonate | 2 |
| Attapulgite clay | 51 |

[1] See Example 24, supra, for the description of the mixture of active compounds.

This composition is prepared by blending together all of the ingredients and grinding in an air attritor mill until the particle size is substantially less than 10 microns.

The formulation is mixed with water and applied as a broadcast treatment by rotovating it into the soil prior to transplanting tobacco plants from seedling beds into the treated soil. The application rate is 120 pounds per acre of the active ingredient. The growing tobacco plants are protected against tobacco black shank caused by *Phytophthora parasitica* var. *nicotianae*.

*Example 29*

|   | Percent |
|---|---|
| Mixture of active compounds[2] | 30 |
| p-Dimethylaminobenzenediazosodium sulfonate | 10 |
| Attapulgite clay | 57 |
| Alkyl naphthalene sulfonate | 2 |
| Partially desulfonated sodium lignin sulfonate | 1 |

[2] See Example 25, supra, for a description of the mixture of active compounds.

This composition is prepared by blending together the ingredients and micropulverizing until the particle size is substantially less than 50 microns.

The formulation is mixed with water to give an emulsion which is sprayed into an open furrow prior to planting cotton seed and closing the furrow. The application rate is 2 pounds per acre (12,000 feet of row) by this in-the-row treatment (which is equivalent to approximately 40 pounds per acre in the treated strip itself). The cotton is protected against such soil fungi as *Rhizoctonia solani, Fusarium oxysporium* f. *vasifectum* and Pythium spp. resulting in healthy cotton plants.

*Example 30*

|   | Percent |
|---|---|
| Mixture of active compounds[3] | 18 |
| Triethanolamine | 20 |
| Methylmercury acetate | 2 |
| Ethylene glycol | 40 |
| Water | 20 |

[3] See Example 26, supra, for a description of the mixture of active compounds.

This composition is prepared by first mixing the active ingredient in the ethylene glycol and adding to this mixture the triethanolamine, methyl mercury acetate and water.

The formulation is diluted with water and rotovated into the soil prior to planting sugar beets. The treated area of soil contains approximately 2 pounds active ingredient per acre which is equivalent to 40 pounds active per acre (12,000 feet of row) since an in-the-row application is made. The sugar beet seed planted in the treated bands is protected against the ravages of soil-borne fungi such as Pythium spp. Healthy stands of sugar beet plants are obtained.

*Example 31*

|   | Percent |
|---|---|
| Mixture of active compounds[1] | 70 |
| Alkylated benzene | 25 |
| Blend of calcium dodecylbenzene sulfonate and nonylphenol polyethylene oxide condensation products | 5 |

[1] See Example 24, supra, for a description of the mixture of active compounds.

This composition is prepared by blending together all of the ingredients until solution is obtained.

The formulation is mixed with water to give an emulsion which is sprayed into an open furrow prior to planting bean seed and closing the furrow. The application rate is 4 pounds active per acre (12,000 foot of row) by this in-the-row treatment (which is equivalent to approximately 80 pounds active per acre in the treated strip itself). The bean seedlings after germination are protected against *Rhizoctonia solani*, and healthy stands of young bean plants are obtained.

*Example 32*

One hundred parts by weight of the mixture of active compounds described in Example 24 is diluted with 600 parts by weight of trichloroethylene. This diluted solution is used to treat fabric used for tarpaulins. The cloth is dipped in the antifungal solution until it is thoroughly wetted. The fabric is then removed from the solution. Excess solvent is removed by passing the fabric through rollers. The cloth is dried by passing it through a chamber of warm circulating air. The treated cloth is thus effectively protected against attack by fungi such as mildew and rot causing organisms which reduce the tensile strength of the fabric and may cause discoloration or stains.

To illustrate the effectiveness of the treatment the fabric is buried for 14 days in soil infested with rot-causing organisms. At the end of the exposure period, the tensile strength of the fabric is essentially unchanged and the fabric is not discolored or stained. Untreated fabric similarly stored in infested soil has lost most of its tensile strength and is badly discolored.

*Example 33*

The formulation of Example 24 is mixed with water to give an emulsion which is sprayed into an open furrow prior to planting cotton seed and closing the furrow. The application rate is 2 pounds per acre (12,000 feet of row) by this in-the-row treatment (which is equivalent to approximately 40 pounds per acre in the treated strip itself). The cotton seedlings after germination are protected against *Rhizoctonia solani* and Pythium spp. and healthy stands of young cotton plants are obtained.

*Example 34*

|   | Percent |
|---|---|
| Mixture of active compounds[1] | 50 |
| Alkylnaphthalene sulfonate, sodium salt | 1 |
| Partially desulfonated sodium lignin sulfonate | 1 |
| Attapulgite clay | 48 |

[1] See Example 24, supra, for a description of the mixture of active compounds.

The solid ingredients are charged to a ribbon blender. The active ingredient is sprayed on while blending.

The above formulation is mixed with water and applied to cotton seed in a slurry treater at a rate of 4 ounces of active ingredient per cwt. of seed. The seed is planted in soil and after germination the seedlings are protected against *Rhizoctonia solani*. A healthy stand of cotton plants is obtained.

*Example 35*

The formulation of Example 34 is mixed with water and applied as a broadcast treatment by rotovating it into the soil prior to transplanting tobacco plants from seedling beds into the treated soil. The application rate is 40 pounds per acre of the active ingredient. The growing tobacco plants are protected against tobacco black shank caused by *Phytophthora parasitica* var. *nicotianae*.

*Example 36*

|   | Percent |
|---|---|
| Mixture of active compounds[1] | 35 |
| Alkylated naphthalenes (principally α-methylnaphthalenes) | 60 |
| Polyoxyethylene adduct of tall oil acids | 5 |

[1] See Example 24, supra, for a description of the mixture of the active compounds.

The active emulsifiable oil is prepared by mixing the mutually soluble components. It can be diluted with water to produce emulsions suitable for application.

The formulation is mixed with water and applied as an in-the-row treatment to soil by rotovating it in prior to planting tomato seedlings in the treated bands. The application rate is 2 pounds per acre active ingredient which is approximately equivalent to 40 pounds per acre in the treated band. Young tomato seedlings planted in the treated soil are protected against the tomato wilt caused by *Fusarium oxysporum* f. *lycopersiei*.

Example 37

| | Percent |
|---|---|
| Mixture of active compounds [1] | 35 |
| Alkylated naphthalenes (principally α-methylnaphthalenes) | 60 |
| Polyoxyethylene adduct of tall oil acids | 5 |

[1] See Example 24, supra, for a description of the mixture of active compounds.

The active emulsifiable oil is prepared by mixing the mutually soluble components. It may be diluted with water to produce emulsions suitable for application.

The formulation is mixed with water and applied at a rate of 60 pounds per acre active ingredient as a soil drench to tobacco seed beds. On germination the young tobacco seedlings are protected against soil-borne "damping-off" organisms.

The formulation can also be mixed with water and used at 40 pounds of active ingredient per acre as a drench in home gardens, flower beds, etc., to protect plants from damping off by soil-borne fungi.

Any of the compounds listed above and numbered 1 to 45 can be substituted for the active ingredient in the aforementioned examples to provide like results.

It is understood that this invention is not limited to the specific examples which have been offered merely as illustration. Modification can be made without departing from the spirit of the invention.

The invention claimed is:

1. A method for the control of fungi, said method comprising applying to fungi a fungicidally effective amount of a compound of the formula:

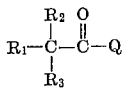

wherein

Q is selected from the group consisting of $OR_4$ and chlorine;

$R_1$, $R_2$ and $R_3$ are each selected from the group consisting of alkyl containing 1 through 10 carbon atoms and alkenyl containing 2 through 10 carbon atoms, with the limitation that $R_1$, $R_2$ and $R_3$ added together will contain at least 6 carbon atoms and not more than 12 carbon atoms; and $R_4$ is selected from the group consisting of hydrogen, sodium, potassium, calcium, magnesium, zinc, manganese, copper, iron, nickel, cadmium, basic salts of zinc, manganese, cadmium, copper, iron and nickel, ammonium, mono-, di- and tri-(alkyl)ammonium where each alkyl group has 1 through 4 carbon atoms, mono-, di- and tri-(alkoxyalkyl)ammonium where the alkoxy and alkyl group each has 1 through 4 carbon atoms, mono-, di- and tri-(hydroxyalkyl)ammonium where the alkyl group has 1 through 4 carbon atoms.

2. A method for controlling fungi according to claim 1 wherein the compound applied is neotridecanoic acid.

3. A method for controlling fungi according to claim 1 wherein the compound applied is neotridecanoic acid, sodium salt.

4. A method for controlling fungi according to claim 1 wherein the compound applied is neotridecanoic acid, dimethylamine salt.

5. A method for the control of fungi, said method comprising the application to soil containing fungi at the rate of 20 to 200 pounds per acre a compound of the formula:

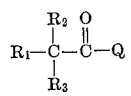

wherein

Q is selected from the group consisting of $OR_4$ and chlorine;

$R_1$, $R_2$ and $R_3$ are each selected from the group consisting of alkyl containing 1 through 10 carbon atoms and alkenyl containing 2 through 10 carbon atoms, with the limitation that $R_1$, $R_2$ and $R_3$ added together will contain at least 6 carbon atoms and not more than 12 carbon atoms; and $R_4$ is selected from the group consisting of hydrogen, sodium, potassium, calcium, magnesium, zinc, manganese, copper, iron, nickel, cadmium, basic salts of zinc, manganese, cadmium, copper, iron and nickel, ammonium, mono-, di- and tri-(alkyl)ammonium where each alkyl group has 1 through 4 carbon atoms, mono-, di- and tri-(alkoxyalkyl)ammonium where the alkoxy and alkyl group each has 1 through 4 carbon atoms, mono-, di- and tri-(hydroxyalkyl)ammonium where the alkyl group has 1 through 4 carbon atoms.

6. A method of protecting manufactured articles from attack by fungi comprising applying to the article a fungicidally effective amount of a compound of the formula:

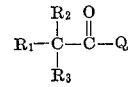

wherein

Q is selected from the group consisting of $OR_4$ and chlorine;

$R_1$, $R_2$ and $R_3$ are each selected from the group consisting of alkyl containing 1 through 10 carbon atoms and alkenyl containing 2 through 10 carbon atoms, with the limitation that $R_1$, $R_2$ and $R_3$ added together will contain at least 6 carbon atoms and not more than 12 carbon atoms; and $R_4$ is selected from the group consisting of hydrogen, sodium, potassium, calcium, magnesium, zinc, manganese, copper, iron, nickel, cadmium, basic salts of zinc, manganese, cadmium, copper, iron and nickel, ammonium, mono-, di- and tri-(alkyl)ammonium where each alkyl group has 1 through 4 carbon atoms, mono-, di- and tri-(alkoxylalkyl)ammonium where the alkoxy and alkyl group each has 1 through 4 carbon atoms, mono-, di- and tri-(hydroxyalkyl) ammonium where the alkyl group has 1 through 4 carbon atoms.

References Cited by the Examiner

UNITED STATES PATENTS

| 2,988,440 | 6/1961 | Bartlett et al. | 71—2.7 |
| 3,149,031 | 9/1964 | Stoffel et al. | 167—30 |
| 3,151,020 | 9/1964 | Cruickshank | 167—22 |

FOREIGN PATENTS

| 604,443 | 9/1948 | Great Britain. |

OTHER REFERENCES

Hauschild: Arzeimittel-Forsch., vol. 3, 1953, pp. 86–90.

LEWIS GOTTS, *Primary Examiner.*

RICHARD L. HUFF, *Assistant Examiner.*